United States Patent [19]

Wineland et al.

[11] Patent Number: 4,463,305

[45] Date of Patent: Jul. 31, 1984

[54] ALTERNATOR LOAD SHEDDER FOR ENGINE STARTING IMPROVEMENT

[75] Inventors: Richard J. Wineland, Dearborn; Robert L. Gault, Garden City, both of Mich.

[73] Assignee: Ford Motor Company, Dearborn, Mich.

[21] Appl. No.: 331,115

[22] Filed: Dec. 16, 1981

[51] Int. Cl.$^3$ .......................... H02J 7/14; H02P 9/04

[52] U.S. Cl. .................................. 322/10; 290/40 R; 320/62; 322/69

[58] Field of Search ...................... 322/59, 10, 11, 28, 322/29, 35, 69, 14, 15; 320/62; 290/40, DIG. 11, 31, 32, 38 D

[56] References Cited

U.S. PATENT DOCUMENTS

| | | | |
|---|---|---|---|
| 1,993,070 | 3/1935 | Middleton | 320/62 X |
| 2,111,971 | 3/1938 | Janes | 290/38 R |
| 2,924,722 | 2/1960 | McClure | 322/69 X |
| 3,270,208 | 8/1966 | Carlson | 290/36 |
| 3,714,541 | 1/1973 | Kuwabara et al. | 322/24 |
| 3,745,442 | 7/1973 | Gynn | 322/24 |
| 3,767,932 | 10/1973 | Bailey | 290/38 |
| 3,878,400 | 4/1975 | McSparran | 290/14 |
| 3,904,948 | 9/1975 | Earle | 322/69 X |
| 4,015,187 | 3/1977 | Sasaki et al. | 322/14 |
| 4,035,712 | 7/1977 | Yarrow et al. | 322/24 |
| 4,146,264 | 3/1979 | Korzeniewski | 322/35 X |

*Primary Examiner*—R. J. Hickey

*Attorney, Agent, or Firm*—Paul K. Godwin, Jr.; Robert D. Sanborn

[57] ABSTRACT

A method and system for delaying mechanical loading of an internal combustion engine by an alternator during start-up and transitional phases of the engine by inhibiting the field winding current of the alternator until the engine reaches a predetermined operational condition for a continuous predetermined period of time.

8 Claims, 1 Drawing Figure

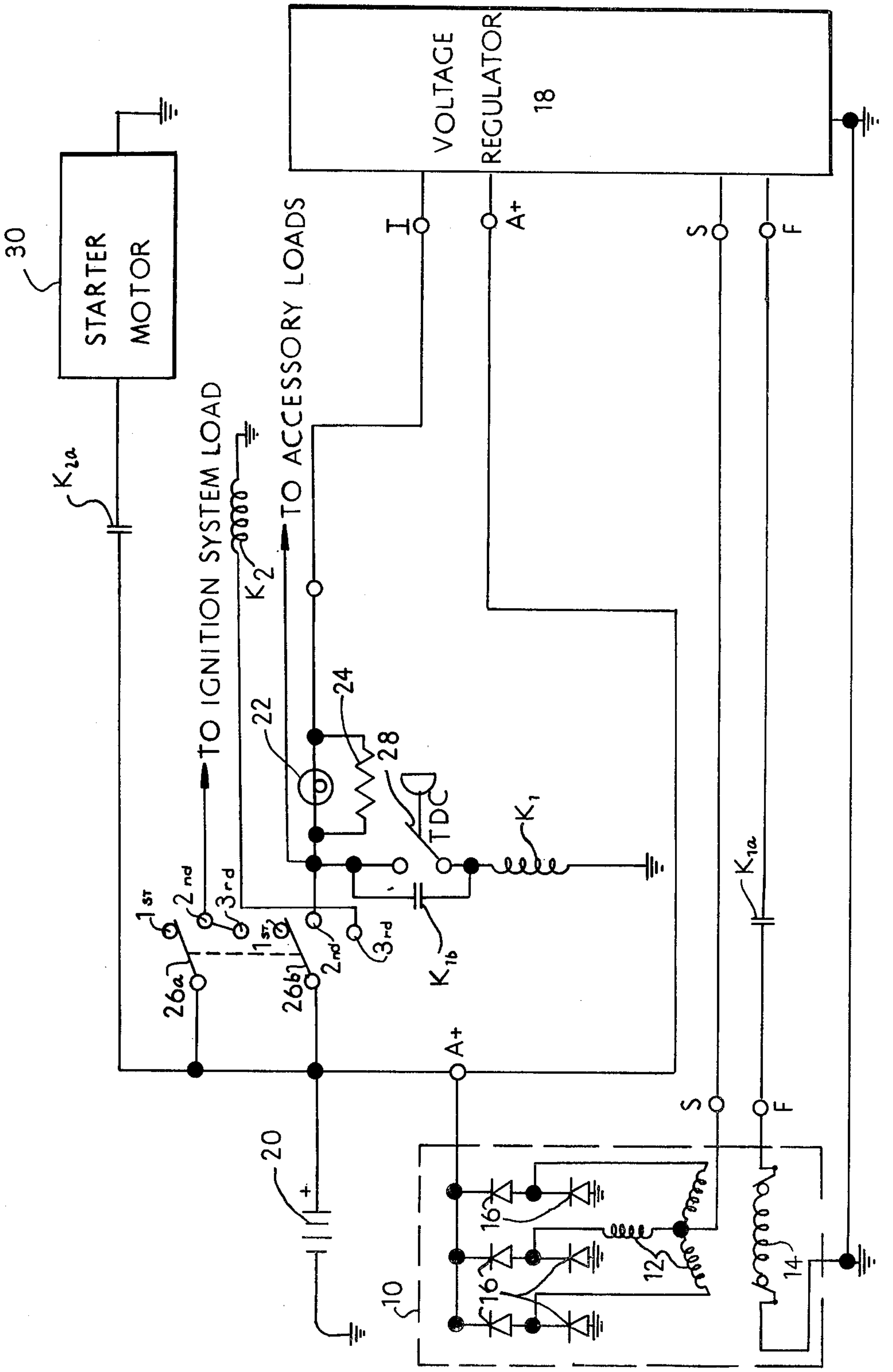
VOLTAGE REGULATOR
18
STARTER MOTOR
30
TO ACCESSORY LOADS
TO IGNITION SYSTEM LOAD
TDC
I
A+
S
F
$K_{2a}$
$K_2$
$K_1$
$K_{1a}$
$K_{1b}$
1st
2nd
3rd
26a
26b
20
22
24
28
10
12
14
16

ALTERNATOR LOAD SHEDDER FOR ENGINE STARTING IMPROVEMENT

BACKGROUND OF THE INVENTION

1. Field of the Invention

The present invention is directed to the field of charging circuits for internal combustion engines and more specifically to the area of load control of engines during start up.

2. Description of the Prior Art

It has been found that on smaller internal combustion engines (four or less cylinders) an initial problem exists during start-up when the engine is cold. During initial ignition, an electrical start motor is energized from a power source, such as a battery, and is mechanically engaged to start the engine. Once the engine is started, the starter motor is disengaged and the engine enters a transition phase wherein it increases its running speed to a preset idle speed. The alternator, which is mechanically connected to the engine, is synchronously driven therewith and provides an output current that is used to recharge the battery and to supply current to other electrical loads that are turned on. The battery is normally at its lowest charge level immediately after start-up of the engine. Accordingly, heavy current is supplied by the alternator to charge the battery during the transition phase. In many instances, the heavy loading by the alternator during the transition phase causes the engine to be overloaded and stalling results. The most common means of preventing such stalling is to increase the fuel/air mixture to the engine; this results in increased fuel consumption and exhaust emissions.

SUMMARY OF THE INVENTION

The present invention is intended to overcome the problems in the prior art by providing a method and system by which alternator loading of the engine is inhibited during the initial start-up of the engine, until such time as the engine reaches a predetermined operational level and for a predetermined time period after it reaches that level. As a result, the initial start-up of a cold engine is facilitated since the alternator does not present any loads to the engine during the transition phase and is prevented from doing so until the engine has reached a cold idle level and has held that level for a predetermined amount of time. Subsequently, after the engine has maintained its operational level for a predetermined period of time, the alternator is electrically enabled through an associated voltage regulator to operate in a normal fashion and take over the electrical loads from the battery.

It is, therefore, an object of the present invention to provide a control system that electrically inhibits mechanical loading by the alternator of an engine during its transition phase.

It is another object of the present invention to provide a control system which delays recharge of a primary supply battery until after the associated internal combustion engine is allowed to run and stabilize.

It is a further object of the present invention to provide a relatively inexpensive means of solving the aforementioned problems.

BRIEF DESCRIPTION OF THE DRAWING

The FIGURE is an electrical schematic of a preferred embodiment of the present invention.

DETAILED DESCRIPTION OF THE PREFERRED EMBODIMENT

The present invention is shown as being incorporated within a conventional charging system for an internal combustion engine, which includes an alternator 10; a voltage regulator 18; a battery 20; an ignition switch 26; a start motor relay K2; and a starter motor 30.

The alternator 10 includes a rotatable field winding 14, which is mechanically driven by the engine (not shown) and has end terminals respectively electrically connected through associated slip rings to ground and the F terminal of the voltage regulator 18. The alternator 10 further includes stator windings 12 (illustrated in a "Y" configuration) to provide three phases of alternating current to three pairs of rectifying diodes 16. The center connection of the stator windings 12 is connected to the S terminal of the voltage regulator 18. The diodes 16 provide rectification for the three phase AC generated by the stator windings 12 and provide a DC output to supply the required current. The A+ line is connected between a corresponding terminal on the voltage regulator 18 and the A+ terminal of the alternator 10. The A+ terminal on the alternator 10 is also connected to the positive terminal of the battery 20 which is the primary DC voltage source for the associated engine and vehicle. The battery 20 provides the necessary electrical energy to drive the starter motor 30 and also provides electrical energy to the ignition and energized accessory loads of the vehicle when the alternator 10 is faulty or otherwise inhibited. The purpose of the alternator 10 is to provide a voltage output which is higher than the primary source battery voltage so as to charge the battery and to provide sufficient power to handle the electrical load of the vehicle while the associated engine is running.

An ignition switch 26 is shown as a double pole triple throw (DPTT) switch wherein both poles 26*a* and 26*b* switch between a first (OFF) position, a second (RUN) position and a third (START) position. While it is true that ignition switches on many vehicles also include separate "ACCESSORY" and "LOCK" positions, those positions are not shown in the FIGURE, since they are not critical to the understanding of the present invention.

The pole terminal of switch 26*a* is connected to the positive terminal of the battery 20. The second and third terminals are shorted together and connected to the ignition system for the associated engine (not shown). The pole terminal of switch 26*b* is also connected to the positive terminal of battery 20. The second terminal of 26*b* is connected to the accessory load and voltage regulator circuit; and the third terminal is connected to a start motor relay coil $K_2$.

The start motor relay coil $K_2$, when energized, closes normally open contacts $K_{2a}$ and electrically connects the starter motor 30 to the positive terminal of the battery 20.

A voltage regulator 18 is conventional, in that it monitors the A+ voltage and accordingly controls the amount of field winding current to maintain the battery voltage at a predetermined level.

In the shown embodiment, a normally open set of relay contacts $K_{1a}$ are interposed in the field line. The contacts are controlled by relay coil $K_1$, which is connected to one side of an actuation and holding circuit. The actuation and holding circuit includes a time delay close (TDC) vacuum switch 28 in parallel with a set of normally open relay holding contacts $K_{1b}$, controlled by the relay coil $K_1$. The parallel connected elements ($K_{1b}$ and 28) are connected between the second terminal of the ignition switch $26_b$ and the relay coil $K_1$.

During the OFF state of the associated internal combustion engine, the system is as depicted in the FIGURE. However, when the ignition switch is changed to the third position, energy from the battery 20 is supplied through switch **26*b* to energize the start motor relay $K_2$. The start motor relay $K_2$ closes normally open contacts $K_{2a}$ and voltage from the battery 20 is thereby connected to the starter motor 30, which in turn drives the associated internal combustion engine. D.C. energy is supplied through switch 26*a* to the ignition system for the associated engine. During this period of time, the field winding circuit of the alternator 10 remains open so that no current is generated by the alternator 10. Therefore, the alternator 10** produces minimal mechanical loading to the internal combustion engine.

After the engine has started, the ignition switch is returned to the second position, thereby deactivating the start motor relay $K_2$; opening the associated contacts $K_{2a}$; and disengaging starter motor 30. In the RUN state, the switch $26_b$ connects the alternator warning lamp 22 to the battery + line, and switch **26*a*** continues to provide battery current to the ignition system.

The alternator 10 remains deactivated until such time as the vacuum within the engine reaches a predetermined level. For example, where an engine is structured so as to not exceed 3" Hg (10 KPa) vacuum during start motor cranking, the TDC vacuum switch 28 may be selected to close after a finite time period of approximately 5 seconds after the engine reached 10" Hg (34 KPa) vacuum. The TDC vacuum switch 28 therefore provides sufficient time for the engine to not only reach a predetermined operational level (10" Hg vacuum) but to be maintained at that level for a predetermined finite period of time (5 seconds). Such a period thereby ensures that the engine is out of its transition phase before allowing the engine to be loaded. At the end of the 5 second delay, after the engine reaches the predetermined operational level, the TDC vacuum switch 28 closes and energizes relay coil K1. Thereupon, the relay contacts $K_{1a}$ close and allow the voltage regulator 18 to energize the field winding 14, of the alternator 10. Thereafter, alternator 10 functions in a normal manner to supply current to the partially depleted battery 20 and to any other energized electrical loads within the vehicle.

When the relay coil K1 is energized, it also closes relay contacts $K_{1b}$ to provide a holding current to the coil $K_1$, in the event the vacuum of the engine subsequently drops below the predetermined level and causes the switch 28 to open. The relay coil K1 will thereby remain energized until such time as the ignition switch **26*b*** is changed from the second position to either the first or third positions.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A system, within an electrical starting system for an internal combustion engine, for preventing mechanical loading by an engine driven alternator until said engine operates at least in its idle condition for a finite predetermined period of time comprising:

means connected to said engine for sensing the operational condition of said engine and producing an output when said engine maintains its idle condition for a predetermined finite period of time;

means connected to said sensing means for inhibiting the field current in said alternator in the absence of said output from said sensing means and for allowing normal field current to flow in said alternator when said output is produced.

2. A system as in claim 1, wherein said electrical starting system includes a primary source of electrical energy;

switching means for separately connecting and disconnecting said primary source to a plurality of defined circuits;

means within a first defined circuit for starting said automotive engine when said switching means connects said primary source to said first circuit;

said sensing means being within a second defined circuit and producing said output by interconnecting said primary source to said inhibiting means when said switching means connects said primary source to said second defined circuit and after said engine idle condition is reached for said predetermined finite period of time; and said inhibiting means includes a first voltage responsive switch which closes the field current line to said alternator when said output is produced by said sensing means.

3. A system as in claim 2, wherein said inhibiting means also includes a second voltage responsive switch which holds both said voltage responsive switches closed when said output is produced by said sensing means, until said switching means disconnects said primary source.

4. A system as in claim 1, wherein said sensing means monitors the vacuum level within said engine and includes a normally open vacuum responsive switch which is closed after said vacuum level exceeds a predetermined value for said predetermined finite period of time.

5. A system as in claim 4, wherein said electrical starting system includes a primary source of electrical energy;

switching means for separately connecting and disconnecting said primary source to a plurality of defined circuits;

means within a first defined circuit for starting said automotive engine when said switching means connects said primary source to said first circuit;

said sensing means being within a second defined circuit which produces said output by interconnecting said primary source of electrical energy to said inhibiting means after said switching means connects said primary source to said second circuit and said engine idle condition is reached for said predetermined finite period of time; and said inhibiting means includes a first normally open voltage responsive switch which closes the field current line to said alternator when said output is produced by said sensing means.

6. A system as in claim 5, wherein said inhibiting means also includes a second normally open voltage responsive switch which is connected to respond to said output of said sensing means to hold both said voltage responsive switches closed until said switching means disconnects said primary source.

7. A method of delaying loading of an internal combustion engine caused by a mechanically connected alternator including the steps of:

opening the field winding circuit of said alternator;

starting said engine;

sensing the operational condition of said engine immediately after said engine is started; and closing the field winding circuit of said alternator when the operational condition of said engine is sensed to be above a predetermined level for a predetermined period of time.

8. A method as in claim 7, wherein said step of closing said field winding circuit of said alternator is performed at least until said engine is stopped.

* * * * *